United States Patent
Cazeaux et al.

(10) Patent No.: US 11,025,683 B2
(45) Date of Patent: Jun. 1, 2021

(54) METHOD OF IMPLEMENTING A COMMUNICATIONS SESSION BETWEEN A PLURALITY OF TERMINALS

(71) Applicant: ORANGE, Paris (FR)

(72) Inventors: Stephane Cazeaux, Authie (FR); Emmanuel Bertin, Luc-sur-Mer (FR)

(73) Assignee: ORANGE, Paris (FR)

( * ) Notice: Subject to any disclaimer, the term of this patent is extended or adjusted under 35 U.S.C. 154(b) by 595 days.

(21) Appl. No.: 14/508,634

(22) Filed: Oct. 7, 2014

(65) Prior Publication Data
US 2015/0100639 A1 Apr. 9, 2015

(30) Foreign Application Priority Data
Oct. 7, 2013 (FR) ...................... 1359692

(51) Int. Cl.
| | |
|---|---|
| H04L 29/06 | (2006.01) |
| H04L 12/18 | (2006.01) |
| H04M 3/56 | (2006.01) |

(52) U.S. Cl.
CPC ............ *H04L 65/403* (2013.01); *H04L 12/18* (2013.01); *H04L 65/1069* (2013.01);
(Continued)

(58) Field of Classification Search
CPC ... H04L 12/18; H04L 65/403; H04L 65/1069; H04L 65/605; H04L 69/24; H04L 69/14; H04M 3/567
See application file for complete search history.

(56) References Cited

U.S. PATENT DOCUMENTS

| | | | | |
|---|---|---|---|---|
| 4,352,180 A | * | 9/1982 | Schulze | H04M 9/025 370/364 |
| 5,568,614 A | * | 10/1996 | Mendelson | G06F 9/542 375/E7.093 |

(Continued)

FOREIGN PATENT DOCUMENTS

| | | |
|---|---|---|
| WO | 2008020928 A2 | 2/2008 |
| WO | 2011149359 A1 | 12/2011 |

OTHER PUBLICATIONS

French Search Report and Written Opinion dated Jan. 28, 2014 for corresponding French Application No. 1359692, filed Oct. 7, 2013.
(Continued)

*Primary Examiner* — Patrice L Winder
*Assistant Examiner* — Angela M Widhalm De Rodrig
(74) *Attorney, Agent, or Firm* — David D. Brush; Westman, Champlin & Koehler, P.A.

(57) ABSTRACT

The invention relates to a method of initializing a communications session between a plurality of terminals. According to the invention, the initialization method is adapted, as a function of capacity data for at least one terminal, to determine a set of at least one stream transmission channel to be set up between entities of a group of entities comprising said terminals, each channel being for setting up between a first entity and a second entity of the group either directly, or indirectly via at least one third entity of said group, and to transmit at least one entity identifier to at least one first entity of the group in order to set up at least one channel of the set. The invention also relates to a method of accessing a communications session, the method being adapted to receive at least one identifier of at least one entity with which at least one channel is to be set up and to set up at least one channel with at least one entity for which said at least one identifier has been received. The invention also relates to a server (S) and to a terminal (TA) respectively for
(Continued)

performing the initialization method and the method of accessing a communications session.

14 Claims, 8 Drawing Sheets

(52) U.S. Cl.
CPC .......... *H04L 65/605* (2013.01); *H04L 69/14* (2013.01); *H04L 69/24* (2013.01); *H04M 3/567* (2013.01)

(56) References Cited

U.S. PATENT DOCUMENTS

| | | | | |
|---|---|---|---|---|
| 5,608,446 A * | 3/1997 | Carr | ............. | H04H 20/79 348/E7.07 |
| 5,784,377 A * | 7/1998 | Baydar | ............. | H04J 3/1611 370/357 |
| 6,104,721 A * | 8/2000 | Hsu | ............. | H04L 29/06 370/431 |
| 6,240,553 B1 * | 5/2001 | Son | ............. | H04N 7/17336 348/E7.073 |
| 6,347,339 B1 * | 2/2002 | Morris | ............. | H04L 43/0811 709/224 |
| 6,453,336 B1 | 9/2002 | Beyda et al. | | |
| 6,611,517 B1 * | 8/2003 | Malik | ............. | H04N 1/00281 370/264 |
| 6,760,748 B1 * | 7/2004 | Hakim | ............. | G09B 5/14 434/350 |
| 7,047,305 B1 * | 5/2006 | Brooks | ............. | H04L 29/06027 348/207.99 |
| 7,089,577 B1 * | 8/2006 | Rakib | ............. | H04N 7/17336 348/E5.008 |
| 7,145,898 B1 * | 12/2006 | Elliott | ............. | H04L 12/66 370/352 |
| 7,292,553 B2 * | 11/2007 | Tiedemann, Jr. | ............. | H04B 7/2631 370/335 |
| 7,346,689 B1 * | 3/2008 | Northcutt | ............. | G06F 15/173 709/219 |
| 7,688,789 B2 * | 3/2010 | Pan | ............. | H04B 7/0417 370/332 |
| 7,738,406 B2 * | 6/2010 | Liu | ............. | H04L 45/00 370/256 |
| 7,814,184 B2 * | 10/2010 | Mandato | ............. | H04L 29/06027 709/220 |
| 8,009,986 B2 * | 8/2011 | Chang | ............. | H04J 14/021 398/79 |
| 8,259,687 B2 * | 9/2012 | Foore | ............. | H04J 3/1682 370/335 |
| 8,483,570 B2 * | 7/2013 | Sadot | ............. | H04B 10/541 398/140 |
| 8,601,058 B2 * | 12/2013 | Ahmad | ............. | H04W 4/50 709/204 |
| 8,706,914 B2 * | 4/2014 | Duchesneau | ............. | G06F 9/5072 709/203 |
| 9,049,073 B2 * | 6/2015 | Klappert | ............. | H04N 21/23109 |
| 9,178,577 B2 * | 11/2015 | Moulsley | ............. | H04B 7/04 |
| 9,420,026 B2 * | 8/2016 | Baldwin | ............. | H04L 65/602 |
| 2003/0206558 A1 * | 11/2003 | Parkkinen | ............. | G10L 19/24 370/477 |
| 2003/0229900 A1 * | 12/2003 | Reisman | ............. | G06F 17/30873 725/87 |
| 2004/0001479 A1 * | 1/2004 | Pounds | ............. | H04L 12/66 370/352 |
| 2004/0047354 A1 * | 3/2004 | Slater | ............. | H04L 41/0896 370/400 |
| 2004/0190453 A1 * | 9/2004 | Rasanen | ............. | H04L 47/14 370/235 |
| 2004/0218627 A1 * | 11/2004 | Kobayashi | ............. | G06F 3/14 370/465 |
| 2005/0122392 A1 * | 6/2005 | Johansen | ............. | H04M 3/562 348/14.09 |
| 2005/0157660 A1 * | 7/2005 | Mandato | ............. | H04L 29/06 370/254 |
| 2006/0193295 A1 * | 8/2006 | White | ............. | H04L 12/5692 370/336 |
| 2007/0005795 A1 * | 1/2007 | Gonzalez | ............. | G06F 17/30017 709/232 |
| 2007/0008884 A1 * | 1/2007 | Tang | ............. | H04L 29/06 370/230 |
| 2007/0087756 A1 * | 4/2007 | Hoffberg | ............. | G06Q 10/0631 455/450 |
| 2007/0260782 A1 * | 11/2007 | Shaikh | ............. | H04L 49/90 710/52 |
| 2007/0274256 A1 * | 11/2007 | Murai | ............. | H04W 72/085 370/328 |
| 2007/0291776 A1 * | 12/2007 | Kenrick | ............. | H04L 29/06027 370/401 |
| 2008/0049775 A1 * | 2/2008 | Morrill | ............. | H04L 41/147 370/419 |
| 2009/0163137 A1 * | 6/2009 | Capparelli | ............. | H04H 60/06 455/3.06 |
| 2009/0257751 A1 * | 10/2009 | Sadananda | ............. | H04J 14/0227 398/83 |
| 2010/0008292 A1 * | 1/2010 | Ludwig | ............. | H04L 45/302 370/328 |
| 2010/0317420 A1 * | 12/2010 | Hoffberg | ............. | G06Q 30/0207 463/1 |
| 2011/0161836 A1 * | 6/2011 | Mu | ............. | H04L 12/1822 715/756 |
| 2011/0317587 A1 * | 12/2011 | Lida | ............. | H04L 12/2832 370/254 |
| 2012/0013705 A1 * | 1/2012 | Taylor | ............. | H04L 12/1818 348/14.08 |
| 2012/0317604 A1 * | 12/2012 | Stallard | ............. | H04L 65/4084 725/96 |
| 2013/0163430 A1 * | 6/2013 | Gell | ............. | H04L 47/20 370/235 |
| 2013/0212228 A1 * | 8/2013 | Butler | ............. | H04L 65/605 709/219 |
| 2013/0272121 A1 * | 10/2013 | Stanwood | ............. | H04L 47/2475 370/230 |
| 2014/0359271 A1 * | 12/2014 | Gedik | ............. | H04L 12/6418 713/100 |
| 2015/0067819 A1 * | 3/2015 | Shribman | ............. | H04L 67/06 726/12 |
| 2015/0082345 A1 * | 3/2015 | Archer | ............. | G06Q 30/0275 725/34 |

OTHER PUBLICATIONS

English translation of the French Opinion dated Jan. 28, 2014 for corresponding French Application No. 1359692, filed Oct. 7, 2013.

* cited by examiner

METHOD OF IMPLEMENTING A COMMUNICATIONS SESSION BETWEEN A PLURALITY OF TERMINALS

The invention relates to the field of communications. More precisely, the invention relates to implementing communications services, such as for example a conference service or a multimedia data stream broadcast service.

Known conference services between terminals are based on using a conference platform, also known as a conference bridge.

During a prior step of booking a conference, each user connects to the conference service and obtains a conference identifier. The user then communicates the conference identifier with users invited to the conference. The conference identifier is in general a number for connection to a conference bridge. It may also be associated with a password.

At the time set for the conference, each participant connects to the conference bridge by using the conference identifier.

The conference bridge manages the streams in the network that are for the terminals connected to the conference. In particular, each terminal sends a stream to the bridge. The bridge aggregates the streams it receives and retransmits to each terminal connected to the conference a single stream that corresponds to the aggregated streams received from the other connected terminals. The contribution from the terminal to which the conference bridge retransmits the stream is omitted. Thus, if N terminals are connected to the conference bridge, each of the N terminals sends a stream to the conference bridge and receives therefrom an aggregated stream from the other N−1 connected terminals.

That system requires considerable resources in the conference bridge, or more generally in the network equipment in charge of aggregating and transmitting the streams.

One of the objects of the invention is to remedy shortcomings and/or drawbacks of the prior art and/or to provide improvements thereto.

The invention seeks to improve the situation.

To this end, the invention relates to a method of initializing a communications session between a plurality of terminals. According to the invention, the initialization method for initializing a communications session comprises the following steps performed by a server:

obtaining capacity data for at least one of said terminals, said capacity data obtained for a terminal relating to the capacity of the terminal to receive and/or transmit a plurality of streams simultaneously;

determining, as a function of said obtained capacity data, a set of at least one stream transmission channel to be set up between entities of a group of entities comprising said terminals, each stream transmission channel of said set being for setting up between a first entity and a second entity of the group either directly, or else indirectly via at least one third entity of said group acting as a communications relay between the first entity and the second entity; and transmitting at least one entity identifier to at least one said first entity of said group for the purpose of setting up at least one stream transmission channel of said set.

Depending on its capacity, a terminal is capable of processing in real time one or more data streams. In particular it is suitable for transmitting and/or receiving simultaneously one or more multimedia data streams, with the number of streams depending on the terminal. The server takes account of the capacity data it obtains for one or more terminals in order to determine a set of channels comprising at least one stream transmission channel to be set up in order to implement a communications session between a plurality of terminals. The transmission channels are for setting up between the entities of a group of entities comprising the terminals, and each channel connects a first entity to a second entity of the group either directly or else indirectly via one or more entities of the group. Such a transmission channel is either a channel connecting together two terminals, or else a channel connecting a terminal to another device, e.g. a communications device. The server then sends, to the entities that are to set up channels, the identifiers of entities with which the channels are to be set up.

The method thus makes it possible in centralized manner to determine the stream transmission channel(s) that is/are to be set up in order to implement the communications session. Depending on the capacity of one or more terminals to handle one or more streams, it may be decided to set up at least some of the channels between terminals. This serves to lighten the load on a communications device, or even to avoid using a communications device.

In a particular implementation of the method of the invention, the step of determining said set of channels comprises the steps of:

calculating, on the basis of the obtained capacity data, a number NF of stream transmission channels that can be set up between said terminals for said communications session;

calculating a number NC of necessary stream transmission channels needed for interconnecting all of the terminals of the plurality of terminals; and comparing said number NF of stream transmission channels that can be set up between said terminals with said number NC of necessary stream transmission channels; and said set of stream transmission channels comprises NC stream transmission channels directly interconnecting two terminals of the plurality of terminals if the number NF of stream transmission channels that can be set up between said terminals is greater than or equal to said number NC of necessary stream transmission channels.

If the number of channels that can be set up between the terminals is greater than a number of channels needed for implementing the stream transmission session, then the channel(s) for setting up are channels between the terminals of the plurality of terminals.

Under such circumstances, there is no need to use a communications device. For example, there is no need to use a conference bridge if the service that is to be performed is a conference session.

According to a characteristic of this implementation of the initialization method, if the number NF of stream transmission channels that can be set up between said terminals is less than said number NC of necessary stream transmission channels, said set of stream transmission channels comprises at least one stream transmission channel to be set up between one of the terminals and a communications device.

When it is not possible for all of the channels to be channels between terminals, it is necessary to have recourse to a communications device. When recourse to a communications device is used only for the channels that cannot be set up between terminals, this serves to lighten the load on the communications device, and thus to economize on the use of the resources of the communications device.

In a particular implementation of the initialization method, after receiving a notification that a terminal of the plurality has been disconnected, or a request for connecting an additional terminal, the determining step is reiterated with a second group of entities comprising the remaining terminals of the plurality, or comprising a third group of entities comprising the terminals of the plurality of terminals plus said additional terminal.

Reiterating the determining step during a session enables the connected terminals to continue the session and enables an additional terminal to join an ongoing session.

According to a particular characteristic of this implementation of the initialization method, during reiteration of the determining step, the channels directly connecting a first entity and a second entity as determined during a preceding iteration are maintained if both the first entity and the second entity remain connected.

This makes it possible to limit the number of channels to be set up during a session. This avoids disturbing the ongoing communications session.

In a particular implementation, the initialization method further includes a step of determining secondary channels used in the event of a terminal being disconnected.

The secondary channels are channels that are set up but that are not used initially for transmitting streams.

Alternatively, the secondary channels are determined but they are not set up.

The secondary channels are backup channels used to replace channels that have been interrupted as a result of a terminal being disconnected.

Setting up secondary channels from the beginning of a session enables the system to adapt quickly to the second group of terminals comprising the terminals that remain connected and avoids any temporary loss in stream transmission.

In a particular implementation of the initialization method, the transmitting step comprises transmitting information about each channel of said set to each of the terminals, said information comprising at least an identifier of a first entity and a second entity identifier.

A terminal is thus informed about all of the channels that need to be set up in order to implement the communications session. This enables it to cause one or more channels to be set up and also to determine whether or not it should accept a request to set up a channel coming from another terminal of the plurality. This also enables the terminal to refuse a request to set up a channel coming from a terminal that is not a terminal in the plurality of terminals. Consequently, this avoids a terminal receiving a stream that is not a stream being transmitted in the context of the communications session.

In a particular implementation of the initialization method, the transmitting step further comprises transmitting service data to each terminal, the service data relating to at least one terminal.

The invention also provides a method of accessing a communications session between a plurality of terminals, the method being characterized in that it comprises the following steps, performed by a terminal of said plurality of terminals:

receiving at least one identifier of at least one entity with which at least one stream transmission channel is to be set up, the stream transmission channel forming part of a set of at least one stream transmission channel to be set up between entities of a group of entities comprising said terminals, each stream transmission channel of said set being for setting up between a first entity and a second entity of the group either directly, or else indirectly via at least one third entity of said group acting as a communications relay between the first entity and the second entity, said set being determined as a function of capacity data obtained for at least one of said terminals, said capacity data obtained for a terminal relating to the capacity of the terminal to receive and/or transmit a plurality of streams simultaneously; and setting up at least one stream transmission channel with said at least one entity for which said at least one identifier has been received.

The channel(s) is/are set up as a function of identifiers received by the terminal.

Because of the channel(s) being set up, the terminal can transmit and/or receive one or more streams.

In a particular implementation of the access method, the setting-up step is followed, after obtaining at least one stream, by a step of transmitting said at least one obtained stream over at least one of the set-up channels, an obtained stream being a stream coming from a stream pick-up device connected to said terminal or a stream received from an entity of said group.

In a particular implementation of the access method, said set of channels includes at least two channels involving said terminal and a stream transmitted over a first channel is a stream obtained by aggregating at least one stream obtained via at least one second channel with a stream received from a stream pick-up device connected to said terminal.

In this implementation, some of the aggregation work load is performed at a terminal. This makes it possible to lighten the load on the central communications device, or indeed to eliminate it.

In a particular implementation of the access method, said set of channels includes at least three channels involving said terminal and the stream transmitted over one of said at least three channels is a stream obtained by aggregating streams obtained via the other channels.

The invention also provides a server comprising:

an obtaining module for obtaining capacity data for at least one terminal of a plurality of terminals, said capacity data obtained for a terminal relating to the capacity of the terminal to receive and/or transmit a plurality of streams simultaneously;

a determination module for acting as a function of said obtained capacity data to determine a set of at least one stream transmission channel to be set up between entities of a group of entities comprising said terminals, each stream transmission channel of said set being for setting up between a first entity and a second entity of the group, either directly or else indirectly via at least one third entity of said group acting as a communications relay between the first entity and the second entity; and a transmission module for transmitting at least one entity identifier to at least one said first entity of said group for the purpose of setting up at least one stream transmission channel of said set.

The invention also provides a terminal comprising:

a reception module for receiving at least one identifier of at least one entity with which at least one stream transmission channel is to be set up, the stream transmission channel forming part of a set of at least one stream transmission channel for setting up between entities of a group of entities comprising a plurality of terminals, each stream transmission channel of said set being for setting up between a first entity and a second entity of the group, either directly or else indirectly via at least one third entity of said group acting as a communications relay between the first entity and the second entity; said set being determined as a function of capacity data obtained for at least one terminal of said plurality of terminals, said capacity data obtained for a terminal relating to the capacity of the terminal to receive and/or transmit a plurality of streams simultaneously; and a set-up module for setting up at least one communications channel with said at least one entity for which said at least one identifier has been received.

The invention also provides a computer program product including instructions for performing the steps of the method of initializing a communications session as described above when loaded in and executed by a processor.

Finally, the invention provides a computer program product including instructions for performing the steps of the method of accessing a communications session as described above, when loaded in and executed by a processor.

Other features and advantages of the present invention appear from the following description of implementations given as non-limiting examples and with reference to the accompanying drawings, in which.

The invention is implemented by means of software and/or hardware components. In this context, the term "module" may correspond, in this document, equally well to a software component or to a hardware component or to a set of hardware and/or software components, suitable for performing a function or a set of functions as described below for the module in question.

A software component corresponds to one or more computer programs, one or more subprograms of a program, or more generally to any element of a program or of software. Such a software component is stored in memory and then loaded into and executed by a data processor of a physical entity (terminal, server, gateway, set-top box, router, etc.) and is capable of accessing the hardware resources of the physical entity (memories, storage media, communications bus, input/output electronic cards, user interfaces, etc.).

In the same way, a hardware component corresponds to any element of a hardware assembly. It may comprise a programmable hardware component or a component incorporating a processor for executing software, e.g. an integrated circuit, a smart card, an electronic card for executing firmware, etc.

An implementation of a method of initializing a communications session and a method of accessing a communications session performed in the system SYS is described below with reference to FIGS. 1 to 4.

Figure 1:
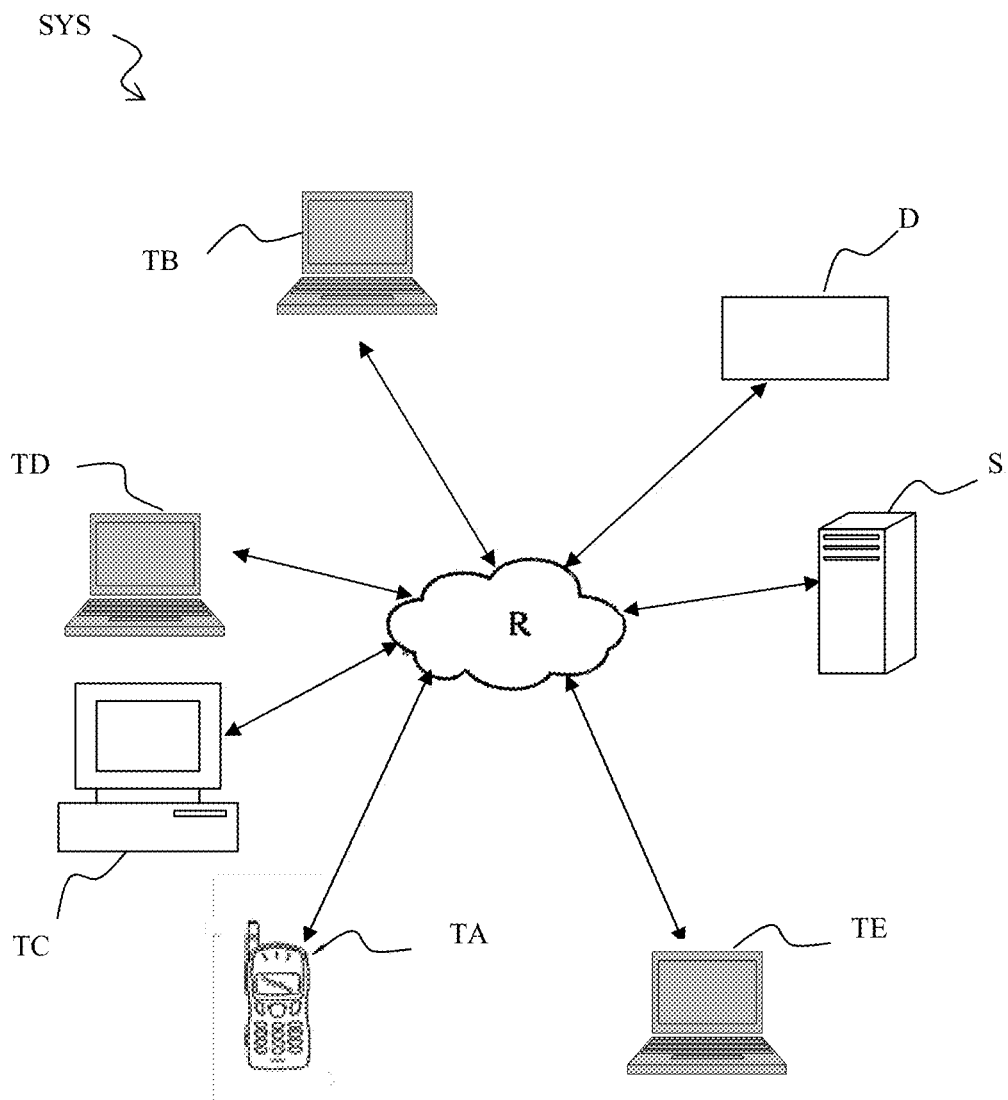
FIG. 1 is a diagram showing a system in an embodiment of the invention.

With reference to FIG. 1, a system SYS comprises a plurality of terminals, e.g. five terminals, TA, TB, TC, TD, and TE, suitable for communicating via a communications network R with a remote server, e.g. a management server S.

The system SYS also comprises a communications device D, e.g. a conference bridge, suitable for accessing the communications network R.

As an alternative, the system SYS could support a plurality of communications devices.

By way of example, the terminal TA is a cellphone terminal.

By way of example, the terminals TB, TC, TD, and TE are personal computer (PC) type computers.

More generally, each terminal TA, TB, TC, TD, TE comprises a piece of equipment suitable for accessing the network R and suitable for sending and receiving one or more multimedia data streams.

By way of example, a multimedia data stream may be an audio and/or video stream, a text type data stream, . . . .

Figure 2:
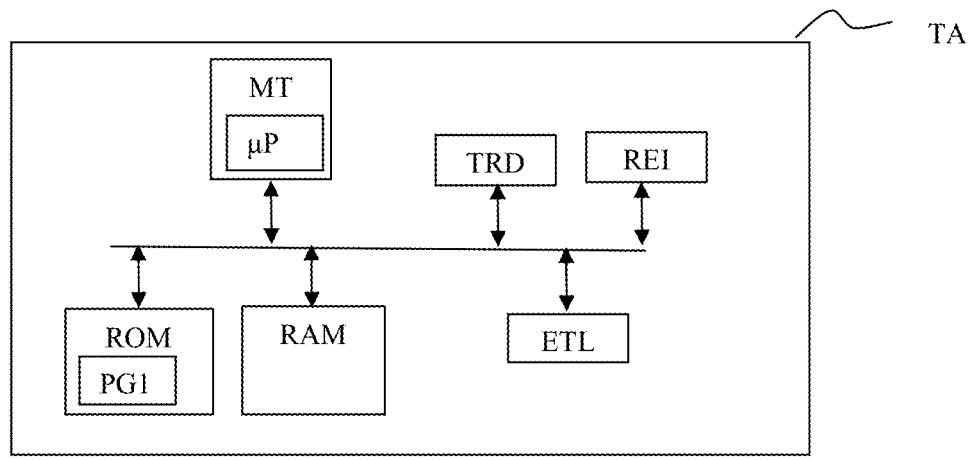
FIG. 2 is a block diagram showing a terminal suitable for performing the steps of a method of accessing a communications session in an implementation of the invention.

FIG. 2 shows a block diagram of a terminal in the system SYS, e.g. the terminal TA.

In conventional manner, the terminal TA comprises specifically: a processor unit MT having a microprocessor; a read only type memory ROM, and a random access type memory RAM. The terminal TA may include, in conventional and non-exhaustive manner, the following elements: a keypad, a screen, a microphone, a loudspeaker, a disk reader, storage means, . . . .

The ROM has registers storing a computer program PG1 including program instructions adapted to perform a communications session access method in an implementation of the invention as described below with reference to FIG. 4.

The terminal TA also has a transmission module TRD, a reception module REI, and a channel setup module ETL.

Figure 3:
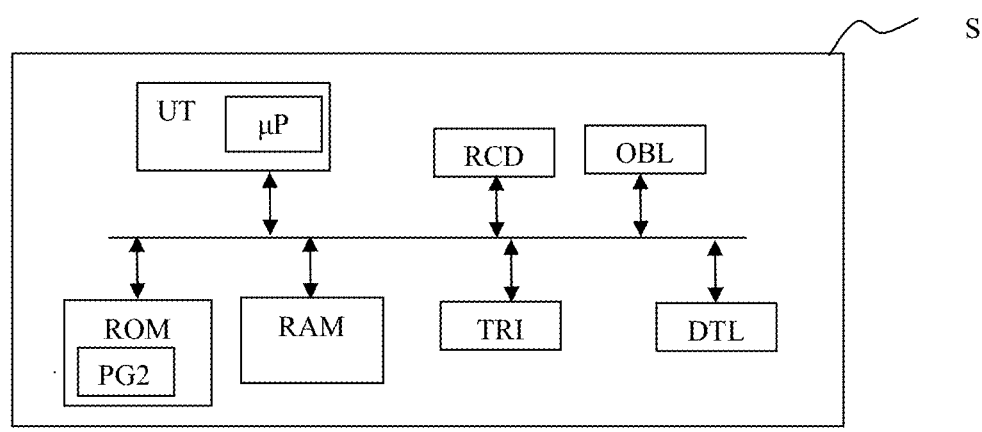
FIG. 3 is a block diagram showing a server suitable for performing the steps of a method of initializing a communications session in an implementation of the invention.

FIG. 3 shows an embodiment of a management server S.

By way of example, the management server S is a computer, and in conventional manner it comprises in particular: a processor unit UT having a microprocessor; a read only type memory ROM; and a random access type memory RAM.

The ROM includes registers storing a computer program PG2 including program instructions adapted to performing a communications session initialization method in an implementation of the invention as described below with reference to FIG. 4.

The management server S also has a reception module RCD, an obtaining module OBL, a determination module DTL, and a transmission module TRI.

An implementation of a communications session initialization method and of a communications session access method as performed by the system SYS is described below with reference to FIG. 4.

Figure 4:
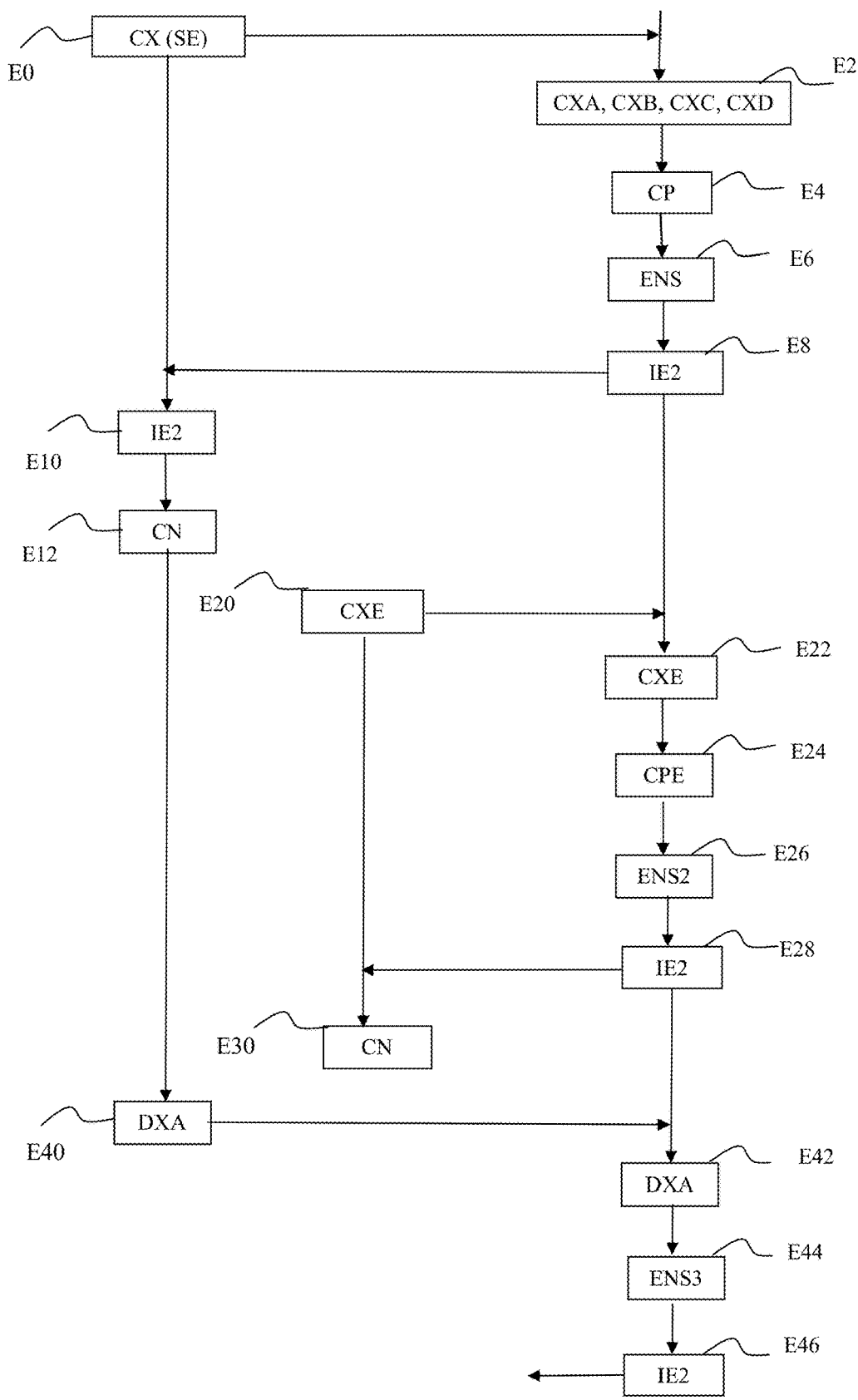
FIG. 4 is a flow chart showing the various steps of a method of initializing a communications session and a method of accessing a communications session in a first implementation of the invention.

FIG. 4 shows firstly the steps of the initialization method performed by the management server S, and secondly the steps of the access method performed by the terminal TA and the terminal TE.

As described below in the description, the access method is also performed by the terminals TB, TC, and TD.

During a step E0, the transmission module TRD of each terminal TA, TB, TC, and TD sends a connection request CX to the management server S, requesting connection to a communications session SE.

The four terminals TA, TB, TC, and TD form a plurality of terminals.

By way of example, the communications session SE is an audio conference session, an audio/video conference session, and on-line game session, an Internet protocol television (IPTV) type broadcast session, . . . .

Each connection request CX is received by the reception module RCD of the management server S during a step E2.

In the presently-described implementation, the management server S receives four connection requests CXA, CXB, CXC, and CXD coming respectively from the terminals TA, TB, TC, and TD.

Alternatively, the list of terminals that are to participate in the communications session may be obtained by the management server S from a predetermined list, e.g. a list previously stored in a memory of the management server S. Under such circumstances, the steps E0 and E2 are not performed.

During a step E4, the obtaining module OBL of the management server S obtains capacity data CP for at least one of the terminals for which it has received a connection request.

The capacity data CP obtained for a terminal relates to the capacity of the terminal to act in real time to process the streams received or transmitted simultaneously by said terminal.

In the presently-described implementation, each connection request CXA, CXB, CXC, and CXD contains capacity data for the terminal that has issued the request.

Under such circumstances, the obtaining step is a step of extracting said capacity data as received in the connection request.

For example, the capacity data contained in a connection request comprises at least the number of streams of at least one predefined type, e.g. an incoming audio/video stream and an outgoing audio/video stream or a bidirectional audio/video stream.

The type of a stream characterizes the type of data conveyed in the stream and the direction in which it is transmitted.

Alternatively, at least one connection request does not contain a number of streams but contains capacity data for the terminal making it possible to obtain at least a number of streams of at least one predefined type. By way of example the capacity data may be the power of the central processor unit (CPU), the available bandwidth, the number of available ports, . . . .

Also by way of alternative, one or more connection requests may include an indication enabling the management server S to obtain capacity information by consulting a database. By way of example, such an indication may be the type of the terminal (cellphone, PC computer, . . . ) an identifier of its operating system, . . . .

Also by way of alternative, only some of the terminals provide capacity data. Under such circumstances, the capacity of the terminal is estimated by the management server S. For example, the capacity of the terminal is estimated as being one or more minimum values, below which the terminal cannot access the session. For example, the number of streams supported by each terminal that has not given capacity data may be estimated as one bidirectional audio/video stream.

Also by way of alternative, the capacity data may be transmitted by the terminals to the management server S independently of a connection request, e.g. in response to a request from the management server S.

During a step E6, the determination module DTL of the management server S determines a set ENS of stream transmission channels CN to be set up between the entities of a group of entities comprising the terminals TA, TB, TC, and TD. Each channel is to be set up between a first entity of the group and a second entity of the group.

Alternatively, the group comprises one or more communications devices.

The number of channels in the set ENS and their types depend on the service to be performed, i.e. the type of the session SE.

By way of example, in the context of an audio conference service, the channels to be set up are channels suitable for conveying bidirectional audio streams, and the number of channels to be set up is the number of channels to be set up to interconnect all the terminals in such a manner that each terminal is in communication with each other terminal, either directly or else via an intermediate entity acting as a relay. The intermediate entity may either be one of the terminals TA, TB, TC, TD from which the management server S has received a connection request, or else the communications device D.

Also by way of example, for a TV stream broadcast service, the channels to be set up are channels suitable for conveying a unidirectional audio/video stream, typically a TV stream, and the number of channels to be set up is the number of channels to be set up so as to enable each terminal to receive the TV stream either directly from the communications device, or else from another terminal.

The set ENS of channels CN is determined as a function of the capacity data obtained during the step E4.

The capacity data obtained for a terminal serves to determine the capacity of the terminal to process incoming or outgoing streams simultaneously.

Consequently, it makes it possible to determine the number of channels that the terminal can support.

Each channel CN for conveying a stream in the set of channels ENS is identified by an identifier IE1 of a first entity E1 suitable for setting up said channel, and an identifier IE2 of a second entity E2. A first or second entity is either one of the terminals TA, TB, TC, and TD from which the management server S has received a connection request, or else the communications device D.

Advantageously, the channels CN are determined so as to restrict as much as possible the number of channels involving the communications device D, i.e. the channels for which the first or second entity is the communications device D.

The channels that are determined may be represented in the form of a graph.

Example graphs are described in the description below.

During a step E8, the transmission module TRI of the management server S transmits at least one identifier IE2 of a second entity to one or more first entities for the purpose of setting up stream transmission channels of the set ENS of channels.

In a variant implementation, the transmission module TRI of the management server S also transmits additional data relating to one or more channels to be set up. By way of example, this additional data may define whether the channels are unidirectional or bidirectional, the types of stream that are to be conveyed by the channels, . . . .

Alternatively, at least one first entity identifier is transmitted by way of information to a second entity.

Also by way of alternative, information relating to some or all of the channels in the set ENS of channels is transmitted to each of the entities.

During a step E10, the reception module REI of at least one first entity receives one or more second entity identifiers.

The step E10 is followed by a step E12 during which each first entity that has received at least one second entity identifier IE2 sets up at least one transmission channel CN with at least one second entity for which it has received an identifier.

When the first entity is a terminal, the channel is set up by the channel set-up module ETL of the terminal.

Once the channel has been set up, it is possible to convey a multimedia data stream via the channel that has been set up. This makes it possible in particular to receive one or more incoming streams transmitted by some other entity of the group of entities and/or to transmit outgoing streams to another entity in the group of entities.

Depending on the implementation, a transmitted stream is a stream received from another channel, a stream received from a pick-up device, such as a microphone or a camera, that is connected to the terminal, a single stream corresponding to aggregated streams received from other channels, and possibly from a pick-up device, . . . .

Depending on the implementation, the transmission channel set up by an entity is a bidirectional channel or a unidirectional channel.

During a step E20, e.g. performed after the step E12, the terminal TE transmits a connection request CXE to the management server S.

The connection request CXE is received by the management server S during a step E22, and during a step E24, the management server S obtains capacity data CPE for the terminal TE.

The terminal TE represents an additional terminal.

During a step E26, the management server S reiterates the determination step E6 with a group of entities comprising the terminals TA, TB, TC, TD, and TE, and it obtains a second set ENS2 of channels.

The group of entities comprising the terminals TA, TB, TC, TD, and TE represents a third group of entities.

The second set of channels ENS2 has a maximum number of channels determined during the preceding determination step.

During a step E28, the management server S transmits at least one second entity identifier IE2 to one or more first entities of the group.

Then, during a step E30, the first entity(ies) cause one or more channels CN to be set up or cleared as a function of the received identifiers.

In an implementation, only the first entities involved by a change in the set of channels receives information from the management server S.

In a variant, each first entity receives once more the information relating to the channels for which it represents a first entity.

In another variant implementation, the information relating to the channels is supplied to all of the terminals TA, TB, TC, TD, and TE of the group.

During a step E40, e.g. performed after the step E12 or after the step E30, one of the terminals of the set of connected terminals, e.g. the terminal TA, sends a disconnection request DXA to the management server S.

The disconnection request DXA is received by the management server S during a step E42.

As an alternative, the management server S detects that the terminal TA is no longer connected.

Disconnection may be voluntary, i.e. at the initiative of the user of the terminal TA, or it may be involuntary, e.g. as a result of a failure of the terminal or a malfunction of the network.

The step E42 is followed by a step E44 during which the management server S reiterates the determination step E6 with a group of entities comprising the terminals TB, TC, TD, and TE that remain connected, and it obtains a third set ENS3 of channels.

The group of entities comprising the terminals TB, TC, TD, and TE represents a second group.

The third set ENS3 of channels has a maximum number of channels determined during the preceding determination step.

During a step E46, the management server S transmits a second entity identifier to one or more first entities.

Thereafter, the first entities that have received at least one second entity identifier cause one or more channels to be set up or cleared as a function of the received identifier.

In an embodiment, only the first entities involved by a change in the set of channels receive information from the management server S.

In a variant, each first entity receives once more the information relating to the channels for which it constitutes a first entity.

The steps E2, E4, E6, and E8 performed by the management server S represent steps of a method of initializing a communications session.

The steps E0, E10, and E12 performed by a terminal represent steps of the method of accessing a communications session.

In a variant embodiment, during the determination step E6, the management server S also determines secondary stream transmission channels. The secondary channels are stream transmission channels to be set up between entities of the group of entities. The secondary channels are channels that are redundant relative to the channels of the set of channels.

In an implementation, these channels are set up by the first entities, but initially they are not active, i.e. they are not used for conveying streams. They are used subsequently, e.g. as a result of a terminal becoming disconnected.

In another implementation, these channels are set up only after a terminal is disconnected.

Figure 5:
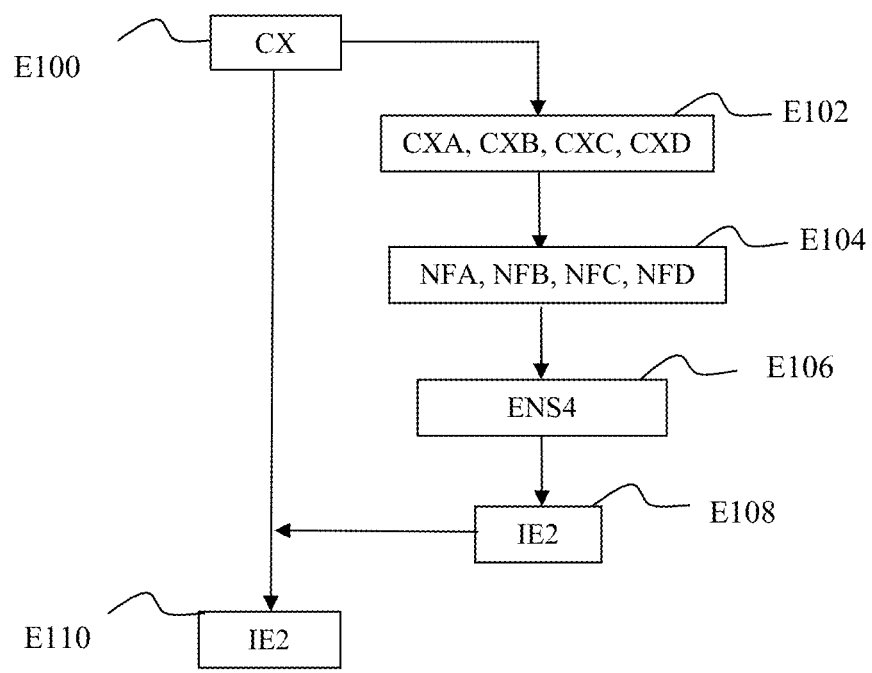
FIG. 5 is a flow chart showing the various steps of a method initializing a communications session and a method of accessing a communications session in a second implementation of the invention.

An implementation of the method of initializing a communications session and a method of accessing a communications session as performed in the system SYS, and in which the communications session is a conference session, is described below with reference to FIG. 5.

In this implementation, each terminal in the plurality includes, in addition to the modules described with reference to FIG. 2, a stream pick-up device, e.g. a microphone and/or a camera, suitable for picking up audio and/or video data and for generating an audio stream and/or a video stream on the basis of the picked-up data.

Each terminal also has at least one stream reception module and at least one stream transmission module.

During a prior step of booking a conference that is performed by a user using a terminal, a conference identifier ICF is received by that user and is sent to the participants invited to the conference.

The booking procedure is a procedure known to the person skilled in the art and is not described in detail herein.

During a step E100, similar to the step E0 of the above-described implementation, each terminal TA, TB, TC, TD sends a connection request CX to the management server S requesting connection to a conference session.

Each connection request CX contains the conference identifier ICF and a number NF of incoming and outgoing streams that can be processed simultaneously by the terminal.

In this example, the number NF of streams corresponds to the number of reception modules and transmission modules included in the terminal.

The number NF of streams represents capacity data for the terminal.

As an alternative, one or more connection requests need not contain a number NF of streams but may instead contain capacity data enabling the number NF of streams to be calculated.

Each connection request CX is received by the management server S during a step E102.

In the presently-described implementation, the management server S receives four connection requests CXA, CXB, CXC, and CXD coming respectively from the terminals TA, TB, TC, and TD.

During a step E104, similar to the step E4 of the above-described implementation, the management server S obtains terminal capacity data for each terminal.

In the presently-described implementation, each connection request CXA, CXB, CXC, and CXD contains a number NFA, NFB, NFC, NFD of incoming or outgoing streams that can be processed simultaneously by the terminal.

For example, the number NFA of streams that can be handled by the terminal TA is two, the number NFB of streams that can be handled by the terminal TB is four, the number NFC of streams that can be handled by the terminal TC is four, and the number of streams NFD that can be handled by the terminal TD is four.

During a step E106, the management server S determines a set ENS1 of channels CN to be set up for performing the conference session.

In this particular implementation in which the communications session is a conference session, the number of channels to be set up is the number of channels to be set up for putting the terminals TA, TB, TC, and TD into communication in such a manner that each terminal is in communication with each other terminal either directly or else via an intermediate entity acting as a relay. The intermediate entity is either a connected terminal, or else the communications device D.

In this implementation, the channels are bidirectional channels, i.e. channels suitable for conveying an incoming stream and an outgoing stream.

More precisely, the management server S calculates a number NC of transmission channels to be set up for performing the conference session, i.e. the number of channels to be set up to enable the terminals TA, TB, TC, and TD to communicate with one another.

The management server S also calculates a number NF of channels that can be set up between the terminals. The number NF may be obtained, for example, by using the formula:

$$NF=(NFA+NFB+NFC+NFD)/2-(NBT-1)$$

where NBT is the number of terminals to be connected together.

The management server S then compares the number NF with the number NC.

When the number NF is greater than or equal to the number NC, the channels are set up directly between the terminals. A communications device is not needed.

When the number NF is less than the number NC, at least one channel is set up between a terminal TA, TB, TC, TD and the communications device D.

Figure 6:
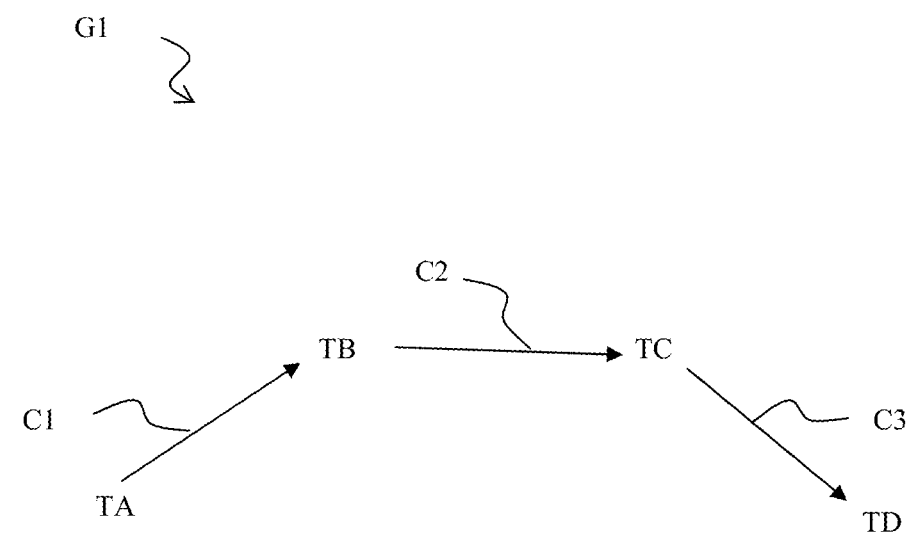
FIG. 6 is a first example of a graph showing a set of channels determined in association with the second implementation.

FIG. 6 shows a first example of a graph G1 showing the communications to be set up between the terminals when NFA=2, NFB=4, NFC=4, and NFD=2. The number NF is then 3 and the number NC is 3. A first channel C1 is to set up between TA and TB, a second channel C2 is to be set up between TB and TC, and a third channel C3 is to be set up between TC and TD.

Figure 7:
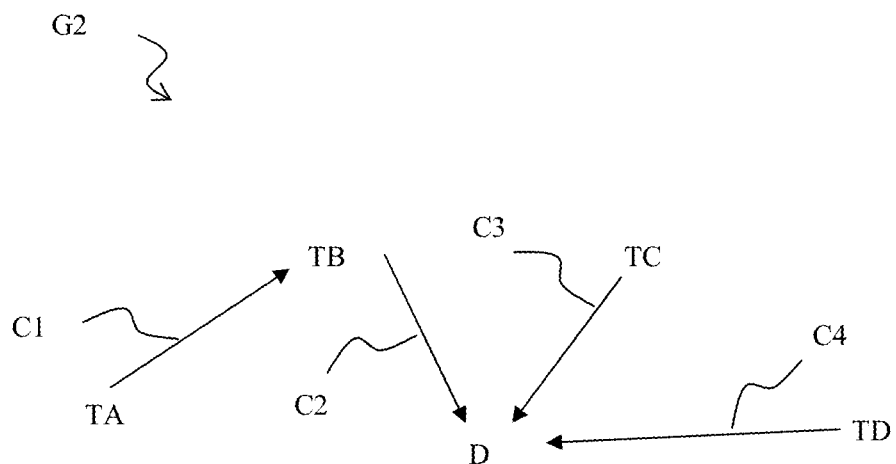
FIG. 7 is a second example of a graph showing a set of channels determined in association with the second implementation.

FIG. 7 shows a second example of a graph G2 showing the channels to be set up between the terminals when NFA=2, NFB=4, NFC=2, and NFD=2. The number NF is then 2 and the number NC is then 3. A communications device D is then needed. A first channel C1 is to be set up between TA and TB, a second channel C2 is to be set up between TB and D, a third channel C3 is to be set up between TC and D, and a fourth channel C4 is to be set up between TD and D.

Each transmission channel is identified by an identifier of a first entity suitable for setting up said channel and an identifier of a second entity. A first or second entity is either one of the terminals TA, TD, TC, and TD for which the management server S has received a connection request, or else the communications device D.

Each transmission channel C is thus identified by a pair (IE1, IE2) in which IE1 is a first entity identifier and IE2 is a second entity identifier.

In FIG. 7, the following channels are obtained: C1 (TA, TB); C2 (TB, D); C3 (TC, D); and C4 (TD, D).

During a step E108, similar to the step E8 of the above-described implementation, the management server S sends at least one second entity identifier IE2 to one or more first entities in order to set up the transmission channels.

For example, the management server S sends an identifier IB of the terminal TB to the terminal TA. It also sends an identifier IDC of the communications device D to the terminals TB, TC, and TD.

Step E108, is followed by a step E110 during which each first entity that has received at least one second entity identifier sets up at least one transmission channel with at least one second entity for which it has received an identifier.

Setting up the channels then enables multimedia streams to be conveyed over the channels that have been set up.

After obtaining a stream received from a pick-up device, the terminal transmits the resulting stream over the channels that have been set up.

When the terminal sets up a plurality of transmission channels, a stream obtained from a transmission channel is transmitted over the other channel(s) that is/are set up.

When a plurality of streams are obtained simultaneously from channels that have been set up and/or from a pick-up device, the terminal transmits over each channel that has been set up a stream that is an aggregate of the streams received from the other channels and from the pick-up device.

Figure 8:
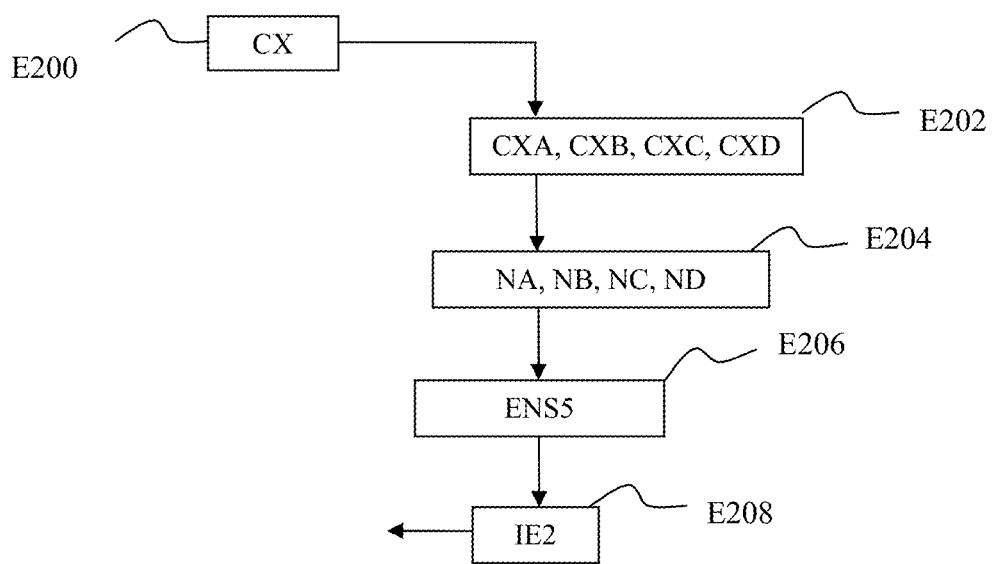
FIG. 8 is a flow chart showing the various steps of a method of initializing a communications session and a method of accessing a communications session in a third implementation of the invention.

An implementation of the communications session initialization procedure and a method of accessing a communications session performed by the system SYS for Internet protocol television (IPTV) type broadcasting is described below with reference to FIG. 8.

In this implementation, a stream transmission channel is a unidirectional channel suitable for conveying a multimedia data stream.

The multimedia data stream in this implementation is a stream transmitted by a broadcast device (not shown) e.g. a TV stream, and it is received in real time by the communication device D.

Alternatively, the multimedia data stream is a stream that has been received beforehand by the communications device D and stored in the form of a file in a memory of the communications device D.

In the presently-described implementation, the communications device D is a device suitable for receiving the stream to be broadcast and for retransmitting it in real time to one or more terminals.

During a step E200, similar to the step E0, each terminal TA, TB, TC, TD sends a connection request CX to the management server S.

Each connection request CX contains a number of unidirectional channels that can be handled simultaneously by the terminal sending the connection request.

Each connection request CX is received by the management server S during a step E202.

In the presently-described implementation, the management server S receives four connection requests CXA, CXB, CXC, and CXD coming respectively from the terminals TA, TB, TC, and TD.

During a step E204, the management server S obtains capacity data for at least one of the terminals from which it has received a connection request.

In this implementation, the capacity data is a number of channels that can be handled in transmission or reception by the terminal under consideration. This data is extracted from the connection requests.

For example, the number of transmission channels that can be handled respectively by the terminals TA, TB, TC, and TD are NA, NB, NC, and ND.

Also by way of alternative, only some of these terminals provide a number of channels they can handle or capacity information enabling the number of channels they can handle to be obtained. Under such circumstances, the number of channels that can be handled by each terminal that has not provided this information is estimated as being equal to one.

During a step E206, the management server S determines a set ENS5 of channels C that need to be set up in order to perform the broadcast service.

The number of channels to be set up is the number of channels to be set up so that each terminal receives the TV stream either directly from the communications device D or else from another terminal.

In the presently-described implementation, the communications device D is a device suitable for receiving a stream to be broadcast and for retransmitting it in real time to one or more terminals.

The set ENS5 of channels is determined as a function of the numbers of channels that can be handled by the various terminals as obtained during the step E204.

Each communications channel is identified by an identifier of a first entity suitable for setting up said channel and an identifier of a second entity. A first or second entity is either one of the terminals TA, TB, TC, TD for which the management server S has received a connection request, or else the communications device D.

By way of example, the set ENS is constituted by four channels C5, C6, C7, and C8.

Each transmission channel C is thus identified by a pair (IE1, IE2) in which IE1 is a first entity identifier and IE2 is a second entity identifier.

Figure 9:
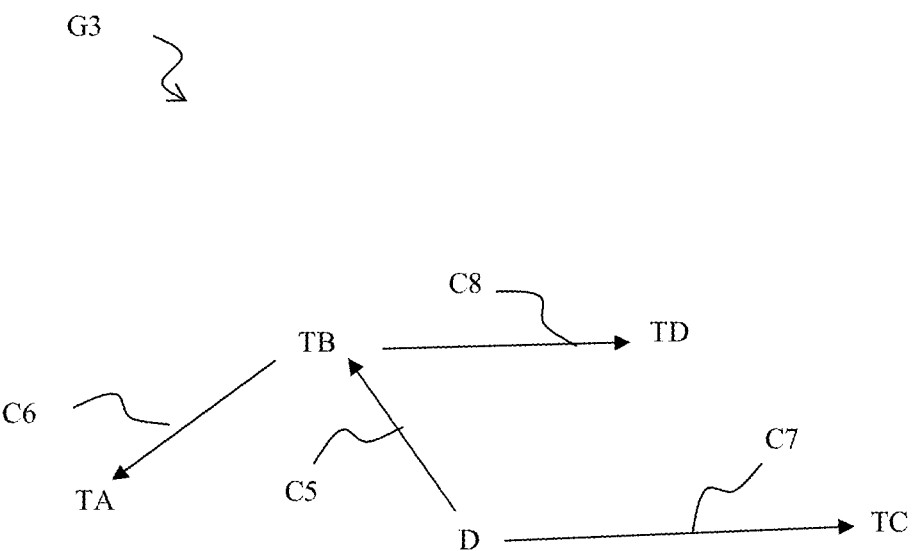
FIG. 9 is a graph showing a set of channels determined in association with the third implementation.

FIG. 9 shows a set of channels determined when NA=1, NB=3, NC=2, and ND=1.

The identifiers IEA, IEB, IEC, and IED are respectively identifiers of the terminals TA, TB, TC, and TD. The identifier IDC is an identifier of the communications device D.

The transmission channel C5 is identified by the pair (IDC, IEB). The transmission channel C6 is identified by the pair (IEB, IEA). The transmission channel C7 is identified by the pair (IDC, IEC). The transmission channel C8 is identified by the pair (IEB, IED).

During a step E208, the management server S transmits at least one second entity identifier IE2 to one or more first entities in order to set up communications channels.

By way of example, the management server S transmits the identifier IEA and the identifier IED to the terminal TB.

By way of alternative, at least one first entity identifier is transmitted for information to a second entity.

Also by way of alternative, information relating to the set ENS of channels is transmitted to each entity.

Each entity that has received at least one second channel identifier sets up at least one transmission channel with at least one second entity for which it has received an identifier.

Once a channel has been set up, it is possible to transmit a multimedia stream over the channel that has been set up.

An implementation of a method of initializing a communications session and a method of accessing a communications session is described below with reference to FIGS. 10 and 11.

Figure 10:
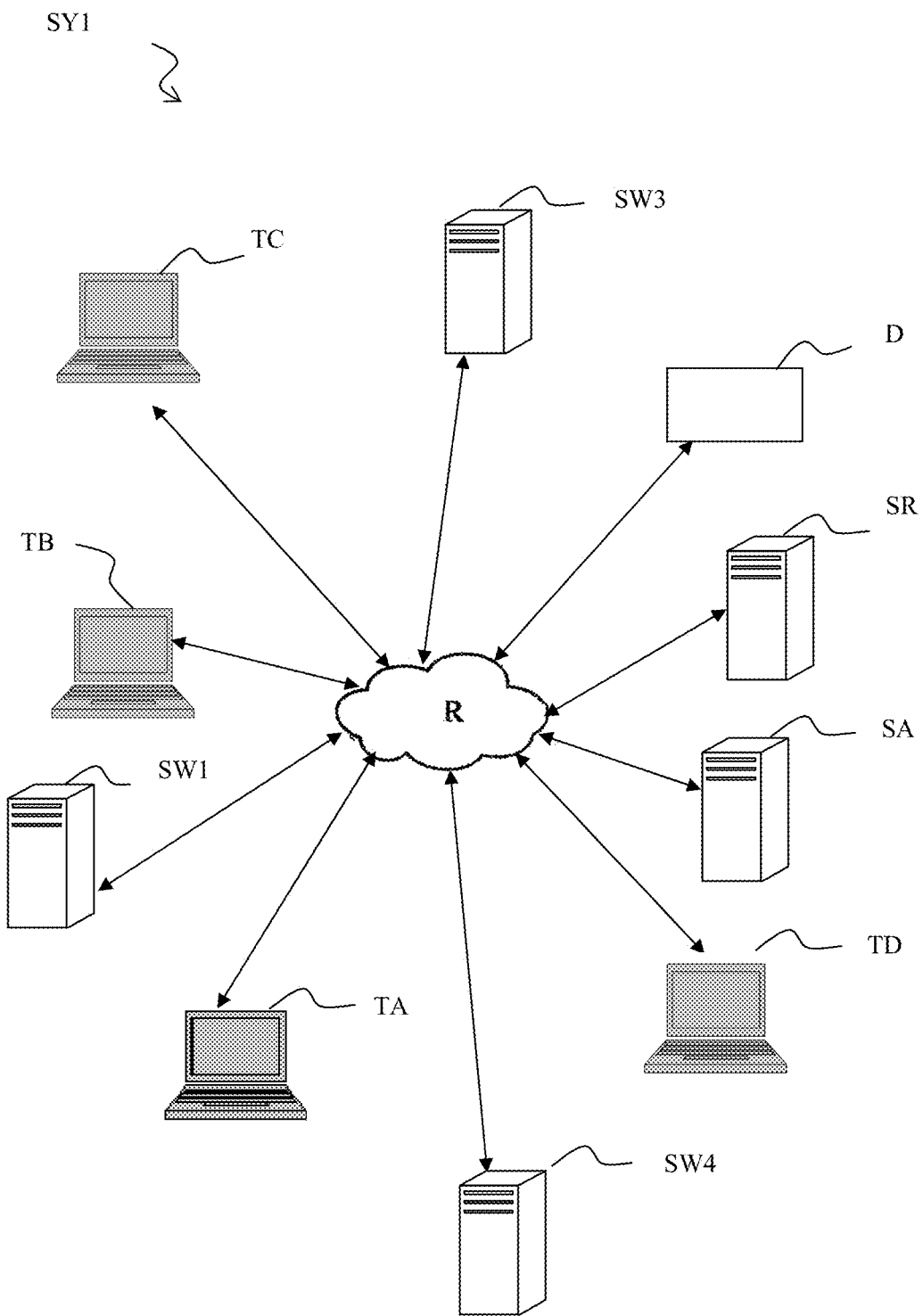
FIG. 10 is a diagram showing a system in an embodiment of the invention.
Figure 11:
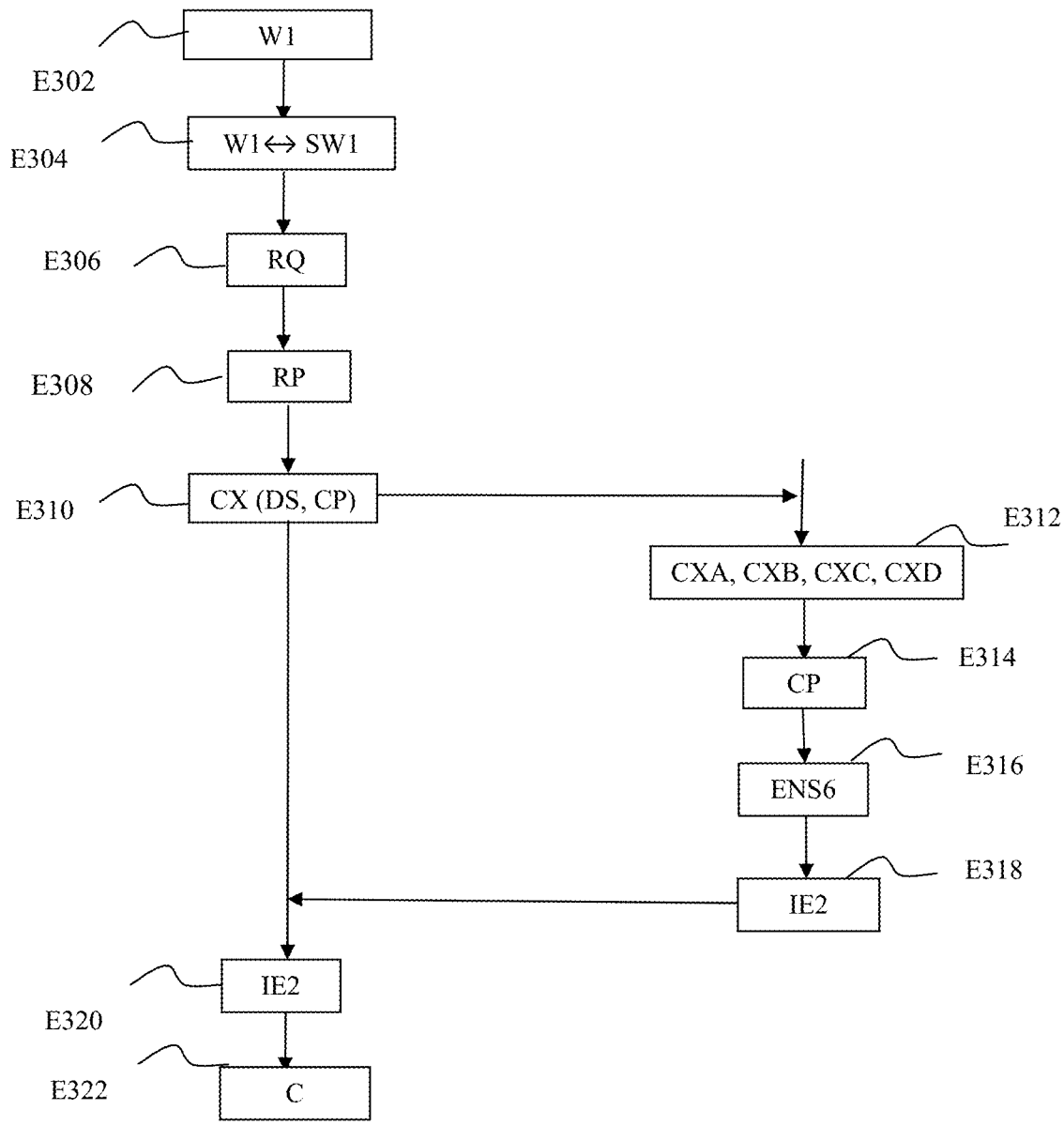
FIG. 11 is a flow chart showing the various steps of a method of initializing a communications session and a method of accessing a communications session in a fourth implementation of the invention.

With reference to FIG. 10, a system SY1 comprises a plurality of terminals, e.g. four terminals TA, TB, TC, and TD suitable for communicating via a communications network R.

The system SY1 also includes a communications device D, e.g. a conference bridge, suitable for accessing the communications network R.

The communications network R comprises the Internet network and/or an Intranet network.

The system SY1 also has one or more connection servers, e.g. three connection servers SW1, SW3, and SW4.

The system SY1 also has an application server SA and a conference management server SR.

Each terminal TA, TB, TC, TD communicates with a remote server, e.g. the application server SA or the conference management server SR, via a connection server with which it is registered.

By way of example, the terminal TA is a cellphone.

By way of example, the terminals TB, TC, TD, and TE are PC type computers.

More generally, each terminal TA, TB, TC, TD comprises equipment capable of accessing the network R and suitable for sending and receiving one or more multimedia data streams.

In this implementation, each terminal includes a web browser NV.

The browser NV is a web browser, i.e. software designed for consulting the worldwide web.

An implementation of the method of initializing a communications session and a method of accessing a communications session as performed in the system SY1 is described below with reference to FIG. 11.

During a prior step of booking a conference, a conference identifier ICF is determined and is transmitted to a terminal of an organizer of the conference.

The step of booking a conference comprises, in known manner, booking a date and a time period for a conference.

The conference identifier ICF is then transmitted by the conference organizer to the people invited to participate in the conference. The conference identifier ICF enables a user to connect with the conference.

By way of example, the conference identifier is a 10-digit telephone number and/or a password.

During a prior step E302, following an action by the user on each terminal, an instance W1, W2, W3, W4 of a web application is downloaded on each of the terminals TA, TB, TC, TD, respectively.

In known manner, the instance of the application is received and stored by the terminal browser NV in response to a download request sent by the terminal browser NV to a download server (not shown).

Each received application instance W1, W2, W3, W4 includes as a parameter an address AD of a connection server SW1, SW3, or SW4.

During a prior step E304, each application instance registers with a connection server.

In the particular implementation described, the application instance W1 installed on the terminal TA and the application instance W2 installed on the terminal TB register respectively with the connection server SW1, the application instance W3 installed on the terminal TC registers with the connection server SW3, and the application instance W4 installed on the terminal TD registers with the connection server SW4.

By way of example, the registration procedure is performed following action by the user on the terminal.

Executing the procedure for registering an application instance of a terminal with a connection server enables a communications channel to be set up between the application instance and the connection server. By means of this communications channel, the application instance can reach and can be reached by entities that are connected to the network R, e.g. the application server SA or the conference management server SR.

The registration procedure also enables the connection server to determine an instance identifier RW and enables said instance identifier RW to be registered in a database in association with an identifier IU of the user of the terminal.

The instance identifier RW determined for an application instance enables said instance to be reached.

The user identifier IU is a reachability identifier for a user, e.g. a telephone number of a terminal of that user, e.g. the terminal TA, or a messaging address. The user identifier IU is specific to the user. It enables the user to be identified uniquely.

Figure 12:
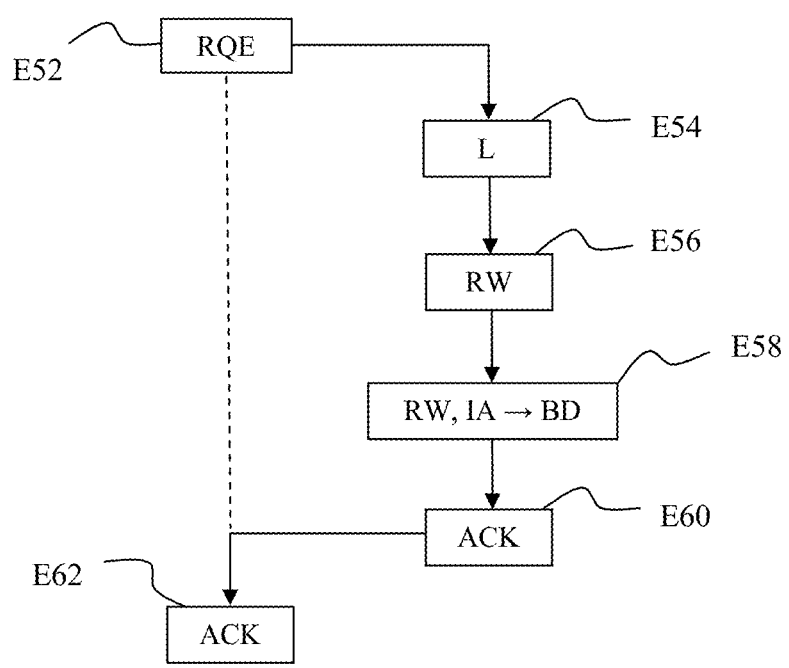
FIG. 12 is a flow chart showing the various steps of a method of storing an instance of an application in an implementation of the invention.

An implementation of a method of registering an application instance with a connection server is described below with reference to FIG. 12.

The step E304 is followed by a step E306 during which each application instance of each terminal TA, TB, TC, TD sends a service request RQ to the application server SA via the connection server to which it is attached.

By way of example, the service request RQ contains the conference identifier ICF.

Alternatively, the request RQ is a conference booking request.

During a step E308, each application instance receives a response RP to the service request RQ and containing service data DS relating to the terminal hosting the application instance.

By way of example, the service data DS may comprise a user name, a photo, and a terminal identifier.

Alternatively, the response RP does not contain service data.

During a step E310, each application instance of each terminal sends a connection request CX to the conference management server SR via the connection server to which it is attached.

The connection request CX contains the instance identifier RW of the application instance, the conference identifier ICF, and some or all of the service data DS and the capacity data CP of the terminal.

Alternatively, when the instance identifier RW is not transmitted to the terminal during the registration stage, the connection request CX includes an identifier IU of the user of the terminal, e.g. an email address of the user, and the connection server replaces the user identifier IU in the connection request CX with the instance identifier RW prior to forwarding the connection request CX to the conference management server SR.

Alternatively, the steps E306 and E308 are not performed by one or more terminals and the connection request sent by those terminals do not include service data DS.

During a step E312, the conference management server SR receives the various connection requests CXA, CXB, CXC, CXD transmitted respectively by the terminals TA, TB, TC, TD.

During a step E314, similar to the step E4, the conference management server SR obtains capacity data CP for at least one of the terminals from which it has received a connection request.

In the presently-described implementation, the obtaining step E314 is a step of extracting data from various connection requests.

During a step E316, similar to the step E6, the conference server SR determines a set ENS6 of stream transmission channels C to be set up in order to perform the conference service.

The set ENS6 is a set of stream transmission channels that are to be set up between entities of a group entities comprising said terminals such that each terminal receives the data transmitted with said session by at least one entity of said group of entities, either directly or else indirectly via at least one intermediate entity of said group acting as a relay.

More precisely, in this implementation, each terminal must be capable of transmitting a multimedia data stream to each other terminal.

The set ENS6 of transmission channels is determined as a function of the capacity data of the various channels as obtained during the step E314.

Each transmission channel is identified by an identifier of a first entity of the group of entities suitable for setting up said channel, and by an identifier of a second entity of the group of entities. A first or second entity is either one of the terminals TA, TB, TC, TD from which the conference management server SR has received a connection request, or else the communications device D.

Advantageously, the transmission channels are determined so as to restrict as much as possible the number of stream transmission channels involving the communications device D, i.e. the transmission channels for which the first entity or the second entity is the communications device D.

For example, the set ENS is constituted by four transmission channels C1, C2, C3, and C4.

During a step E318, the conference management server SR transmits information relating to the set ENS6 of channels to each of the entities.

For each channel in the set ENS6 of channels, this information relating to the set ENS6 comprises a first entity identifier and a second entity identifier. The information also includes service data DS relating to each terminal.

Alternatively, only some of the information relating to the set ENS6 of channels is transmitted to one or more terminals. For example, the conference management server SR transits at least one second entity identifier IE2 to the first entities for the purpose of setting up transmission channels.

During a step E320, at least one entity receives one or more second entity identifiers.

The step E320 is followed by a step E322 during which each first entity that has received at least one second entity identifier sets up at least one transmission channel with at least one second entity for which it has received an identifier.

Once a transmission channel has been set up, it is possible to transmit a multimedia stream over the channel.

A particular implementation of registering a web application W with a connection server SW is described below with reference to FIG. 12.

During a step E52, e.g. following an action by the user on the terminal TA for launching execution of the application instance W, the application instance W sends a connection set-up request RQE to the connection server SW by means of the address AD received as a parameter while downloading the application instance W.

Alternatively, the address AD of the connection server SW is not received during the downloading stage, and the address AD of the connection server SW is received by the application instance W in response to an address request made with the service management server of address that was received initially during downloading the application instance W.

Also by way of alternative, the address AD of the connection server SW may be obtained by the application instance W by performing a domain name system (DNS) type search.

The connection set-up request RQE is received by the connection server SW during a step E54, and the connection server SW sets up a communications channel L with the browser NW. The communications channel L may be a websocket type connection, for example.

In known manner, the communications channel L enables communication to take place between the connection server SW and the browser NV, and consequently enables communication to take place between the connection server SW and the application instance W.

During a step E56, the connection server SW orders an instance identifier RW to be determined for the application instance W.

In the presently-described implementation, the instance identifier RW is determined by the connection server SW.

Alternatively, the instance identifier RW is determined by a host server or by a central server.

The instance identifier RW comprises a first identifier ID1 and a second identifier ID2.

The second identifier ID2 serves to identify the host server within the network R. It is a pointer to the host server. The host server is a connection server or some other server.

When the host server is not the connection server associated with the application instance, the first identifier ID1 is a value or a string of characters serving firstly to enable the host server to identify a connection server and secondly enabling the identified connection server to identify the communications channel L.

The first identifier ID1 represents the web application instance W in unique manner at the host server.

It enables the connection server SW to identify the communications channel L, and consequently to identify the web application instance W from among the application instances that are connected thereto. It constitutes a local pointer to the communications channel L.

In the presently-described implementation where the connection server SW represents a host server, the second identifier ID2 serves to identify the connection server SW within the network R, and the first identifier ID1 is a value or a character string enabling the connection server SW to identify the communications channel L.

By way of example, the second identifier ID2 is a domain name associated with the connection server SW.

The second identifier ID2 may for example be an absolute domain name, also known as a fully qualified domain name (FQDN), i.e. a domain name that gives the absolute position of a node representing the connection server SW in the tree structure of the network R by specifying all of the domains of higher level all the way to the root.

For example, the second identifier ID2 is "server45.communications.orange.fr".

Alternatively, the second identifier is a relative domain name, e.g. "communications.orange.fr". In this variant, the first identifier ID1 is generated by way of example in centralized manner within the domain and the connection server SW needs to refer to a central entity, e.g. a database, in order to obtain all or part of the first identifier ID1.

Also by way of alternative, the first identifier ID1 is determined in application of predefined determination rules. For example, each first identifier ID1 includes a prefix identifying the connection server SW. In another example, number ranges are allocated to each connection server by a central server, and the connection server SW allocates the first identifier ID1 as a function of the allocated range.

By way of example, the instance identifier RW is obtained by concatenating the first identifier ID1 and the second identifier ID2.

By way of example, the instance identifier is a uniform resource identifier (URI).

By way of example, the instance identifier RW is of the form "rsi: ID1@ID2" where "rsi" is a term identifying an instance identifier.

The connection server SW registers the instance identifier RW in association with a connection identifier IC in a correspondence table of the connection server SW.

The connection identifier IC is a value or a character string enabling the connection server SW to find the communications channel L associated with the application instance W from among the various connection channels that have been set up.

By way of example, the connection identifier IC is an identifier of the communications channel L.

During the step E58, the connection server SW causes the instance identifier RW to be registered in association with a user identifier IA in a database.

The user identifier IA is a reachability identifier of the user A, e.g. a telephone number of a terminal of the user A, e.g.

the terminal TA, or a messaging address of the user A. The user identifier IA is specific to the user A. It enables the user A to be identified uniquely.

By way of example, the user identifier IA is contained in the connection set-up request RQE.

Alternatively, the user identifier IA may for example be obtained in response to a user identifier request transmitted to an identity server (not shown) and containing proof of the identity of the user A. By way of example, the proof of identity may be obtained during a prior stage of authenticating the user A, e.g. with the help of a login/password pair, and it is transmitted in the connection set-up request RQE.

Alternatively, the instance identifier RW is registered and the user identifier IA is obtained by a registration server (not shown), and the step E58 is a step of sending a request to this registration server for registering the web application instance W. The registration request contains the instance identifier RW generated during the step E56.

Alternatively, the registration request also contains information specific to the service.

During a step E60, the connection server SW sends an acknowledgment message ACK to the application instance W via the communications channel L and the browser NV.

The acknowledgment message ACK constitutes proof that the communications channel L has been set up.

The acknowledgment message ACK contains the instance identifier RW.

Alternatively, the acknowledgment message ACK does not contain the instance identifier RW.

The acknowledgment message ACK is received by the application instance W during a step E62 and a message informing the user that the connection has been set up may for example be displayed on a graphics interface of the browser NV.

The instance identifier makes it possible to identify uniquely the application instance in the network. The second identifier serves to address a host server. The first identifier then enables the host server to identify the associated connection server and then enables the connection server to identify the application instance that is to be contacted from among the application instances that are connected thereto.

The invention claimed is:

1. An initialization method comprising:
   initializing a multimedia communications session between a plurality of at least three terminals, said communications session involving multimedia streams exchanged between said terminals either bypassing or through a communications device, each terminal of the plurality and the communication device being able to communicate with a server via a network, said initializing comprising the following acts performed by the server to support lightening a load on the communication device:
   receiving for each terminal of the plurality a connection request, said connection request including capacity data for the terminal, said capacity data relating to capacity of the terminal to process incoming or outgoing stream transmission channels simultaneously;
   obtaining for each terminal of the plurality, as function of the capacity data received, a number of stream transmission channels supported simultaneously by said terminal, wherein types of the stream transmission channels are predefined and depend on a service to be done by the multimedia communication session, the type of each of said stream transmission channels defining a type of data conveyed in said stream transmission channel and defining if the stream is unidirectional or bidirectional;
   determining a graph representing entities of a group of entities and links between entities to set up the multimedia communications session, said group comprising the terminals of the plurality and, depending on the capacity data, the communication device,
      each link interconnecting directly two entities representing a stream transmission channel of the predefined type to be set up between said entities,
      each terminal of the plurality being linked to each other terminal of the plurality either directly or via at least another entity of the group,
      the number of entities linked to each terminal of the plurality of terminals depending respectively of said number of stream transmission channels supported by said terminal, and
      for each link interconnecting directly two entities, determining a first entity and a second entity from among the two entities; and
   initializing the multimedia communications session by transmitting at least one entity identifier of at least one determined second entity to at least one said respective first entity of said group for setting up at least one stream transmission channel of the multimedia communications session represented by a link of said graph.

2. The initialization method according to claim 1, wherein determining said graph comprises the following acts:
   calculating, on the basis of said numbers of stream transmission channels supported by the terminals, a number of links of said graph interconnecting directly two terminals;
   calculating a number of necessary stream transmission channels needed for interconnecting all of the terminals of the plurality of terminals; and
   comparing said number of links interconnecting directly two terminals with said number of necessary stream transmission channels; and
   wherein said graph comprises only stream transmission channels directly interconnecting two terminals of the plurality of terminals if the number of links interconnecting directly two terminals is greater than or equal to said number of necessary stream transmission channels.

3. The initialization method according to claim 2, wherein, if the number of links interconnecting directly two terminals is less than said number of necessary stream transmission channels, said graph comprises at least one stream transmission channel to be set up between one of the terminals and a communications device.

4. The initialization method according to claim 1, wherein, after receiving a notification signal that a terminal of the plurality has been disconnected, or a request for connecting an additional terminal, the determining act is reiterated with a second group of entities comprising the remaining terminals of the plurality, or comprising a third group of entities comprising the terminals of the plurality of terminals plus said additional terminal.

5. The initialization method according to claim 4, wherein, when reiterating the determining act, the stream transmission channels between a first entity and a second entity as determined during a preceding iteration are maintained if both of the first and second entities remain connected.

6. The initialization method according to claim 1, wherein the method further includes an act of determining secondary stream transmission channels used in the event of a terminal being disconnected.

7. The initialization method according to claim 1, wherein the transmitting act comprises transmitting information about each stream transmission channel of said number of stream transmission channels to each of the terminals, said information comprising at least an identifier of a first entity and a second entity identifier.

8. The initialization method according to claim 7, wherein the transmitting act further comprises transmitting service data to each terminal, the service data relating to at least one terminal.

9. An access method comprising:
accessing a multimedia communications session between a plurality of at least three terminals, said communications session involving multimedia streams exchanged between said terminals either bypassing or through a communications device, each terminal of the plurality and the communication device being able to communicate with a server via a network, wherein the accessing comprises the following acts performed by a terminal of said plurality of terminals to support lightening a load on the communication device:
receiving at least one identifier of at least one second entity with which at least one stream transmission channel is to be set up, the at least one identifier being received from the server, which has received for each terminal of the plurality of terminals a connection request comprising capacity data for said terminal, said capacity data relating to capacity of the terminal to process incoming or outgoing stream transmission channels simultaneously, has obtained for each terminal of the plurality, as function of the capacity data received, a number of stream transmission channels supported simultaneously by said terminal, wherein types of the stream transmission channels are predefined and depend on a service to be done by the multimedia communication session, the type of each stream transmission channel defining a type of data conveyed in the stream transmission channel and defining if the multimedia stream is unidirectional or bidirectional, and has determined a graph representing entities of a group of entities and links between entities to set up the multimedia communications session, said group comprising the terminals of the plurality and, depending on the capacity data, the communication device,
each link interconnecting directly two entities representing a stream transmission channel of the predefined type to be set up between said entities,
each terminal of the plurality being linked to each other terminal of the plurality either directly or via at least another entity of the group,
the number of entities linked to each terminal of the plurality of terminals depending respectively of said number of stream transmission channels supported by said terminal, and
for each link interconnecting directly two entities, determining a first entity and a second entity from among the two entities; and
accessing the multimedia communications session by setting-up at least one stream transmission channel of the multimedia communications session directly with said at least one respective second entity for which said at least one identifier has been received.

10. The access method according to claim 9, wherein the setting-up act is followed, after obtaining at least one multimedia stream, by an act of transmitting said at least one obtained multimedia stream over at least one of the set-up stream transmission channels, an obtained multimedia stream being a stream coming from a stream pick-up device connected to said terminal or a stream received from an entity of said group.

11. The access method according to claim 9, wherein said number of stream transmission channels includes at least two channels involving said terminal and wherein a multimedia stream transmitted over a first channel is a stream obtained by aggregating at least one stream obtained via at least one second channel with a stream received from a stream pick-up device connected to said terminal.

12. The access method according to claim 9, wherein said number of stream transmission channels includes at least three channels involving said terminal and wherein the stream transmitted over one of said at least three channels is a stream obtained by aggregating streams obtained via the other channels.

13. A server, wherein the server comprises:
a processor; and
a non-transitory computer-readable medium comprising instructions stored thereon, which when executed by the processor configure the server to initialize a multimedia communications session between a plurality of at least three terminals, said communications session involving multimedia streams exchanged between said terminals either bypassing or through a communications device, each terminal of the plurality and the communication device being able to communicate with the server via a network, the server initializing the communications session to support lightening a load on the communication device by performing acts comprising:
receiving for each terminal of the plurality a connection request, said connection request including capacity data for the terminal, said capacity data relating to capacity of the terminal to process incoming or outgoing stream transmission channels simultaneously;
obtaining for each terminal of the plurality, as function of the capacity data received, a number of stream transmission channels supported simultaneously by said terminal, wherein types of the stream transmission channels are predefined and depend on a service to be done by the multimedia communication session, the type of each stream transmission channel defining a type of data conveyed in the stream transmission channel and defining if the multimedia stream is unidirectional stream or bidirectional;
determining a graph representing entities of a group of entities and links between entities to set up the multimedia communications session, said group comprising the terminals of the plurality and not comprising the server,
each link interconnecting directly two entities representing a stream transmission channel of the predefined type to be set up between said entities,
each terminal of the plurality being linked to each other terminal of the plurality either directly or via at least another entity of the group,
the number of entities linked to each terminal of the plurality of terminals depending respectively of said number of stream transmission channels supported by said terminal, and for each link interconnecting directly two entities, determining a first entity and a second entity from among the two entities; and initializing the multimedia communications session by transmitting at least one entity identifier of at least one determined second entity to at least one said respective first entity of said group for setting up at least one stream transmission channel of the multimedia communications session represented by a link of said graph.

14. A terminal, which comprises:

a processor; and a non-transitory computer-readable medium comprising instructions stored thereon, which when executed by the processor configure the terminal to perform a method of accessing a multimedia communications session between a plurality of at least three terminals, said communications session involving multimedia streams exchanged between said terminals either bypassing or through a communications device, each terminal of the plurality and the communication device being able to communicate with a server via a network, wherein the method comprises the following acts performed by the terminal to support lightening a load on the communication device:

receiving at least one identifier of at least one second entity with which at least one stream transmission channel is to be set up, the at least one identifier being received from a server, which has received for each terminal of the plurality of terminals a connection request comprising capacity data for the terminal, said capacity data relating to capacity of the terminal to process incoming or outgoing stream transmission channels simultaneously, has obtained for each terminal of the plurality, as function of the capacity data received, a number of stream transmission channels supported simultaneously by said terminal, wherein types of the stream transmission channels are predefined and depend on a service to be done by the multimedia communication session, the type of each stream transmission channel defining a type of data conveyed in the stream transmission channel and defining if the multimedia stream is unidirectional or bidirectional, and has determined a graph representing entities of a group of entities and links between entities to set up the multimedia communications session, said group comprising the terminals of the plurality and, depending on the capacity data, the communication device, each link interconnecting directly two entities representing a stream transmission channel of the predefined type to be set up between said entities, each terminal of the plurality being linked to each other terminal of the plurality either directly or via at least another entity of the group, the number of entities linked to each terminal of the plurality of terminals depending respectively of said number of stream transmission channels supported by said terminal, and for each link interconnecting directly two entities, determining a first entity and a second entity from among the two entities; and accessing the multimedia communications session by setting-up at least one stream transmission channel of the multimedia communications session directly with said at least one respective second entity for which said at least one identifier has been received.

* * * * *